(12) United States Patent
Yamazaki et al.

(10) Patent No.: US 8,794,751 B2
(45) Date of Patent: *Aug. 5, 2014

(54) INK JET RECORDING DEVICE

(75) Inventors: Soichi Yamazaki, Shiojiri (JP); Ayako Nishiki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 256 days.

This patent is subject to a terminal disclaimer.

(21) Appl. No.: 13/072,095

(22) Filed: Mar. 25, 2011

(65) Prior Publication Data

US 2011/0234695 A1    Sep. 29, 2011

(30) Foreign Application Priority Data

Mar. 26, 2010    (JP) .................................. 2010-072409

(51) Int. Cl.
*B41J 2/01*    (2006.01)
*B41J 2/21*    (2006.01)
*B41J 2/165*    (2006.01)

(52) U.S. Cl.
CPC *B41J 2/01* (2013.01); *B41J 2/2107* (2013.01); *B41J 2/16538* (2013.01)
USPC ................................ 347/100; 347/95; 347/33

(58) Field of Classification Search
CPC ........ B41J 2/2107; B41J 2/01; B41J 2/16535; B41J 2/16538
USPC ............... 347/21, 28, 33, 95–100; 106/31.13, 106/31.27, 31.6; 523/160, 161
See application file for complete search history.

(56) References Cited

U.S. PATENT DOCUMENTS

| 7,641,306 B2 | 1/2010 | Ohkuma |
| 8,246,734 B2 | 8/2012 | Okabe et al. |
| 2002/0038613 A1* | 4/2002 | Yatake .......................... 106/31.6 |
| 2002/0085048 A1* | 7/2002 | Ishinaga et al. .................... 347/6 |
| 2004/0010056 A1 | 1/2004 | Takahashi et al. |
| 2005/0062796 A1* | 3/2005 | Mott et al. ....................... 347/33 |
| 2005/0093948 A1* | 5/2005 | Morris et al. .................. 347/100 |

(Continued)

FOREIGN PATENT DOCUMENTS

| JP | 56-166274 A | 12/1981 |
| JP | 2006-159730 A | 6/2006 |

(Continued)

OTHER PUBLICATIONS

Sakai, S., "Piezoelectric Ink Jet Printing Technique and PX Ink", Annual Meeting of Union of Chemistry-Related Societies in Chubu Area (2008), p. 75, 34.

(Continued)

*Primary Examiner* — Matthew Luu
*Assistant Examiner* — Rut Patel
(74) *Attorney, Agent, or Firm* — Nutter McClennen & Fish LLP (57) ABSTRACT

An ink jet recording device is provided which includes an ink jet head which has a nozzle surface where a plurality of nozzle opening ends are arranged and which ejects water-based ink from the nozzles to a recording medium and a wiping device that executes a wiping operation where the nozzle surface and a wiping member are brought into contact and the nozzle surface is wiped, where oleic acid and a dispersant for dispersing the oleic acid into water by emulsifying the oleic acid are added to the water-based ink.

4 Claims, 4 Drawing Sheets

(56) References Cited

U.S. PATENT DOCUMENTS

| | | |
|---|---|---|
| 2006/0268080 A1* | 11/2006 | Nakazawa ..................... 347/86 |
| 2009/0274418 A1 | 11/2009 | Holzwarth et al. |
| 2011/0234685 A1 | 9/2011 | Yamazaki et al. |
| 2011/0234686 A1 | 9/2011 | Yamazaki et al. |

FOREIGN PATENT DOCUMENTS

| | | |
|---|---|---|
| JP | 2007-160549 A | 6/2007 |
| JP | 2008-001003 A | 1/2008 |
| JP | 2009-274418 A | 11/2009 |
| WO | 2009-066372 A1 | 5/2009 |

OTHER PUBLICATIONS

Kanaya, M. et al., Printing Ink Course, p. 51, Japan Society of Colour Material (2007).

U.S. Appl. No. 13/072,129, filed Mar. 25, 2011, Ink Jet Recording Apparatus.

U.S. Appl. No. 13/072,963, filed Mar. 28, 2011, Ink Jet Recording Apparatus.

* cited by examiner

INK JET RECORDING DEVICE

BACKGROUND

1. Technical Field

The present invention relates to an ink jet recording device.

2. Related Art

With an ink jet recording device, in order to maintain or restore excellent ejection characteristics, a maintenance process of an ink jet head (may be referred to below as recording head) is periodically performed.

As the maintenance process, there is, for example, removing of ink, dust, paper particles, or the like adhered in the vicinity of nozzles by wiping a nozzle surface of a recording head, or a wiping operation of performing a purge process to readjust a meniscus by destroying the meniscus of a nozzle.

In JP-A-2006-159730, a wiping member is disclosed which carries out a water repelling process in order to maintain stable wiping performance over a long time.

In JP-A-2007-160549, a mechanical structure is disclosed which, as a countermeasure to a deterioration in a water repelling property of a face (nozzle surface) in a nozzle vicinity of a recording head, glycerin with a water repelling property is applied to a wiping member that wipes only the face.

However, in the related art as above, there are the following problems. In JP-A-2006-159730, there is a case where, even if a water repelling process is carried out on the wiping member, the water repelling property deteriorates as a result of long-term use, ink is attached to the wiping member, and then thickens, hardens, and accumulates, and there is a concern that ink is drawn out of the nozzles during the wiping operation and a so-called missing nozzle is induced.

Further, in JP-A-2007-160549, it is necessary to separately provide a mechanical structure to apply glycerin with a water repelling property to the wiping member, and there are problems of cost, installation space, and efficiency of the wiping operation.

SUMMARY

An advantage of some aspects of the invention is to provide an ink jet recording device that can easily and cheaply suppress the inducement of missing nozzles during a wiping operation.

According to an aspect of the invention, there is provided and ink jet recording device including an ink jet head which has a nozzle surface where a plurality of nozzle opening ends are arranged and which ejects water-based ink from the nozzles to a recording medium and a wiping device that executes a wiping operation where the nozzle surface and a wiping member are brought into contact and the nozzle surface is wiped, where oleic acid and a dispersant for dispersing the oleic acid into water by emulsifying the oleic acid are added to the water-based ink.

According to the aspect, the oleic acid which does not easily dissolve in water is dispersed into a solvent (water) of the water-based ink by emulsification using a dispersant. The oleic acid which is dispersed into ink tends to remain on a surface of the wiping member or on a surface of ink which is attached to the wiping member when separated as a liquid oil film which is close to a monomolecular film when moisture in the ink evaporates. Because oleic acid has lipophilic and water-repelling properties, and since the ink, which is in the nozzle vicinity inside a nozzle when a nozzle surface is wiped, is not drawn out, it is difficult for missing nozzles to be induced.

Further, by using a dispersant, there is an effect of stabilizing the dispersion of the oleic acid in the water-based ink. The dissolving property and dispersion stability of the oleic acid in water is low, and the oleic acid easily separates, for example, similar to a salad dressing using vegetable oil. For this reason, the expiration date of ink to which the oleic acid has been added is shortened to from several minutes to several months. Therefore, by using a dispersant and dispersing the oleic acid stably in water by emulsifying the oleic acid, the ink expiration date can be extended to be longer.

In addition, according to another aspect of the invention, a configuration is adopted wherein the dispersant is potassium oleate, sodium oleate, or ethanol.

Since the potassium oleate, the sodium oleate, and the ethanol have good compatibility with both the oleic acid and water in terms of dissolving, and as a dispersant, it is possible to stably disperse the oleic acid in water by emulsifying the oleic acid, and the ink expiration date can be extended to be longer.

In addition, according to still another aspect of the invention, a configuration is adopted wherein 0.05 weight % or more and 3.00 weight % or less of the oleic acid and 0.05 weight % or more and 3.00 weight % or less of the dispersant are added to the water-based ink.

If the oleic acid is less than 0.05 weight %, it is difficult for a sufficient suppressing effect against the inducement of missing nozzles to be realized. On the other hand, if the oleic acid exceeds 3.00 weight %, the dispersion stability is lowered, and there is a detrimental influence on the suppressing effect on the inducement of missing nozzles.

If the dispersant is less than 0.05 weight %, the dispersion stability of oleic acid is lowered, and there is a detrimental influence on the suppressing effect on the inducement of missing nozzles. On the other hand, if the dispersant exceeds 3.00 weight %, an oil film of the oleic acid is not stable, and it is difficult for a sufficient suppressing effect on the inducement of missing nozzles to be realized.

In addition, according to still another aspect of the invention, a configuration is adopted wherein the nozzle surface has a plurality of nozzle rows where the nozzles are arranged in a predetermined direction, and the oleic acid and the dispersant are added to the water-based ink ejected from at least one row out of the nozzle rows.

According to the aspect, if there is at least one row out of the nozzle rows on a nozzle surface that ejects water-based ink with the oleic acid dispersed therein, since a wiping member comes into contact with the ink during a wiping operation and a water repelling property is applied, inducement of missing nozzles from other nozzle rows can be suppressed.

In addition, according to still another aspect of the invention, a configuration is adopted wherein the nozzle surface has a plurality of nozzle rows where the nozzles are arranged in a predetermined direction, and the oleic acid and the dispersant are added to the water-based ink ejected from the first nozzle row which comes into contact with the wiping member during the wiping operation.

According to the aspect, since the wiping member contacts the first nozzle row that ejects water-based ink with the oleic acid dispersed therein and a water repelling property is applied during the wiping operation, inducement of missing nozzles from other nozzle rows that are contacted later is suppressed.

In addition, according to still another aspect of the invention, a configuration is adopted wherein the nozzle surface has a plurality of nozzle rows where the nozzles are arranged in a predetermined direction for each type of ink with different color tones, and the oleic acid and the dispersant are added to the water-based ink ejected from the nozzle row which corresponds to a black color tone.

According to the aspect, since a usage frequency of the water-based ink of a black color tone is high, it is easier for the ink to become a mist and adhere to a nozzle surface compared to the ink of other color tones, but since the oleic acid is added and dispersed in the ink, a water repelling property is easily applied to a wiping member during a wiping operation and a water repelling property is also easily applied to a nozzle surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, embodiments of an ink jet recording device according to the invention will be described with reference to the drawings. Further, in each diagram used for the descriptions below, scaling of each component is suitably changed in order to make each component an identifiable size. In the embodiment, an ink jet printer (referred to below as a printer) is used as an example of an ink jet recording device according to the invention.

Figure 1:
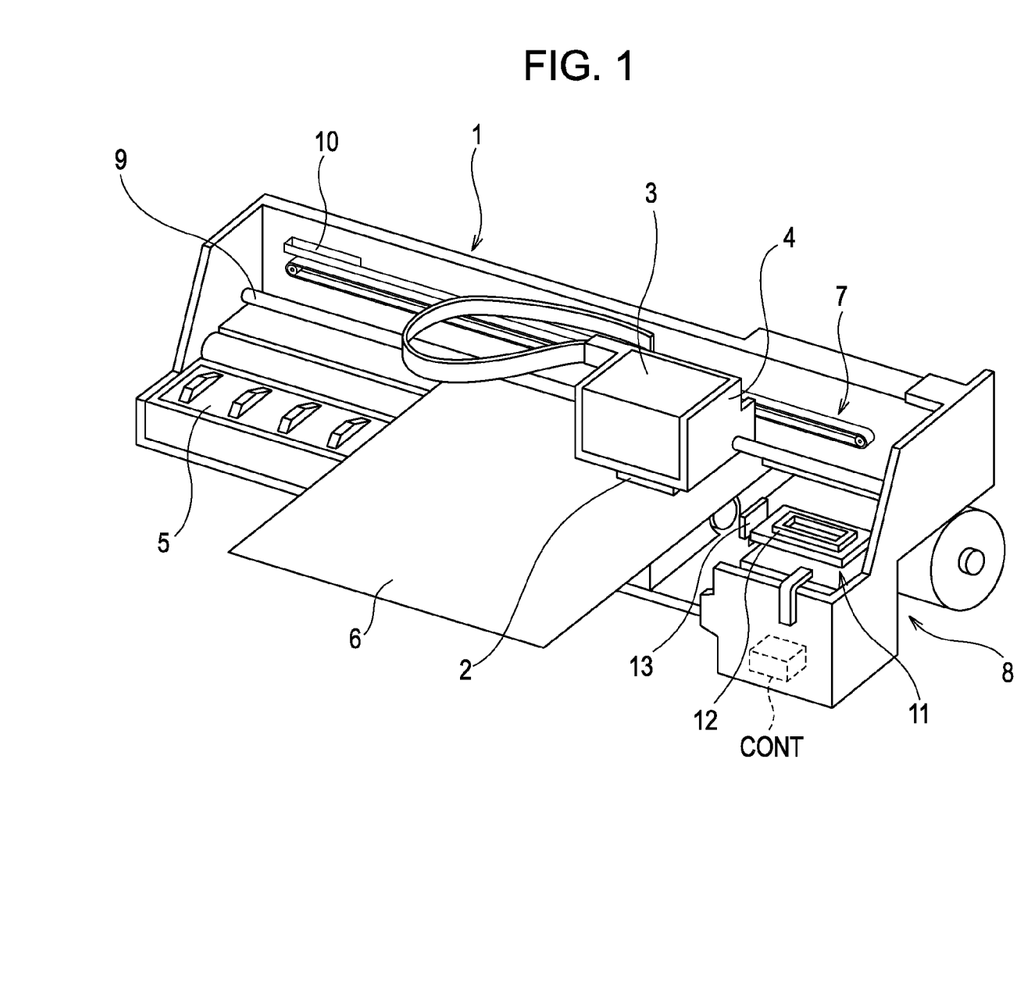
FIG. 1 is a perspective diagram illustrating a configuration of a printer according to an embodiment of the invention.

FIG. 1 is a perspective diagram illustrating a configuration of a printer 1 according to an embodiment of the invention.

As shown in the diagram, the printer 1 is configured to have a carriage 4 which is mounted with a recording head (ink jet head) 2 and is installed with an ink cartridge 3 so as to be detachable and attachable, a platen 5 which is arranged in a lower part of the recording head 2 and which transports a recording paper (recording medium) 6, a carriage moving mechanism 7 which moves the carriage 4 in a paper width direction of the recording paper 6, and a paper sending mechanism 8 which transports the recording paper 6 in a paper sending direction. In addition, the printer 1 has a control device CONT which controls operations of the entire printer 1. Further, the paper width direction is a main scanning direction (head scanning direction). The paper sending direction is a sub scanning direction (a direction that is orthogonal to the main scanning direction).

The ink cartridge 3 is not limited to a cartridge that is installed on the carriage 4 as in the embodiment, but a type of cartridge may be adopted which is installed on a housing side of the printer 1 and supplies to the recording head 2 via an ink supply tube. The ink cartridge 3 accommodates ink of different colors, for example yellow (Y), magenta (M), cyan (C), and black (K).

A guide rod 9 is a support member arranged in the main scanning direction. The carriage 4 is attached in a state of being supported by the guide rod 9. The carriage 4 is moved in the main scanning direction along the guide rod 9 using the carriage moving mechanism 7. A linear encoder 10 detects a position in the main scanning direction of the carriage 4. The detection signal is sent to the control device CONT as position information. The control device CONT recognizes the scanning position of the recording head 2 based on the position information from the linear encoder 10 and controls a recording operation (discharge operation) and the like by the recording head 2. In addition, the control device CONT has a configuration where it is able to variably control the movement speed of the carriage 4.

Figure 2:
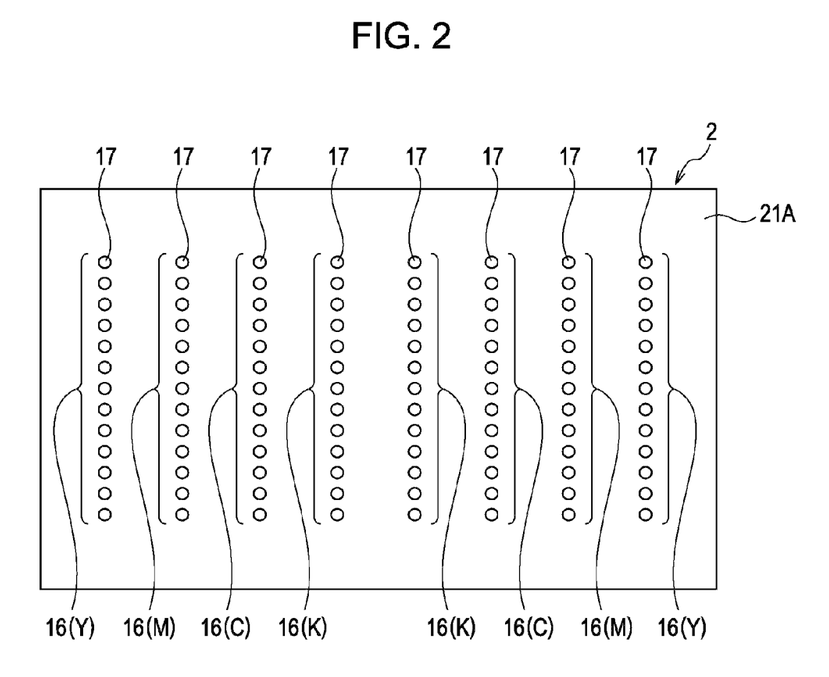
FIG. 2 is a diagram illustrating an arrangement of nozzles provided on a recording head according to an embodiment of the invention.

FIG. 2 is a diagram illustrating an arrangement of nozzles 17 provided on the recording head 2 according to an embodiment of the invention.

As shown in the diagram, the recording head 2 has a nozzle surface (nozzle formation surface) 21A where a plurality of nozzles 17 which eject ink are arranged. In the nozzle surface 21A, a plurality of nozzle rows 16 are formed where a plurality of nozzles 17 are arranged in the sub scanning direction. Each of the nozzle rows 16 is able to discharge, for example, ink of different colors. In the embodiment, there are a total of eight rows provided, two rows each of (16(K), 16(M), 16(C), 16(Y)) corresponding to the colors of ink. One of the nozzle rows 16 is configured by, for example, 180 nozzles 17.

Figure 3:
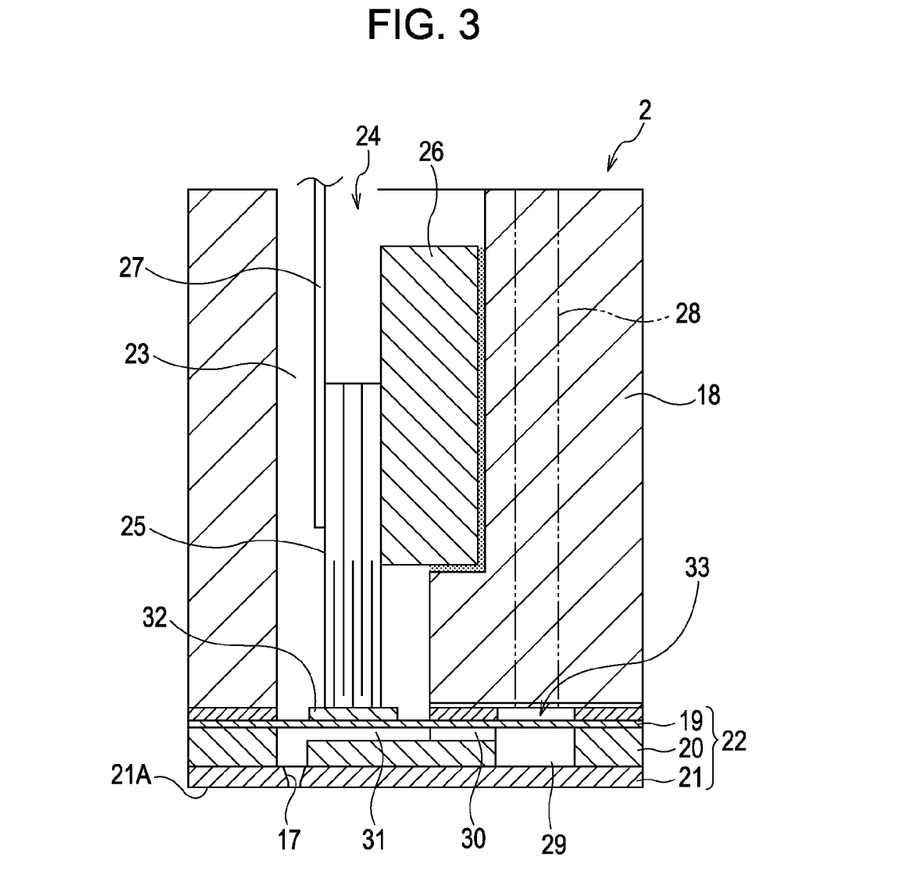
FIG. 3 is a partial cross-sectional diagram illustrating an internal configuration of a recording head according to an embodiment of the invention.

FIG. 3 is a partial cross-sectional diagram illustrating an internal configuration of the recording head 2 according to an embodiment of the invention.

As shown in the diagram, the recording head 2 is provided with a head body 18 and a flow path forming unit 22 connected to the head body 18. The flow path forming unit 22 is provided with a vibrating plate 19, a flow path substrate 20, and a nozzle substrate 21, and forms a common ink chamber 29, an ink supply port 30 and a pressure chamber 31. Furthermore, the flow path forming unit 22 is provided with an island portion 32 which functions as a diaphragm portion and a compliance portion 33 which absorbs pressure fluctuations in the common ink chamber 29. In the head body 18, an accommodation space 23 which accommodates a fixed portion 26 and a driving unit 24 and an inner flow path 28 which guides ink to the flow path forming unit 22 are formed.

According to the recording head 2 with a piezo configuration, a piezoelectric element 25 is compressed or expanded when a driving signal is input to the driving unit 24 via a cable 27. According to this, the vibrating plate 19 is deformed (moved) in a direction closer to or a direction away from a cavity. As a result, the capacity of the pressure chamber 31 changes and there is variation in pressure in the pressure chamber 31 which accommodates ink. Ink is ejected from the nozzle 17 due to the variation in pressure.

Returning to FIG. 1, out of the movement range of the recording head 2, in a region of an outer side of the platen 5, a home position is set which becomes a scanning origin of the recording head 2. In the home position, a maintenance unit (wiping device) 11 is provided. The maintenance unit 11 is configured to execute a moisture retention operation where the recording head 2 is capped by a capping member 12 at times other than a printing operation and evaporation of ink is suppressed, a flushing operation where ink is normally ejected from the recording head 2 to prevent clogging of the nozzle 17 due to thickened ink and to adjust the meniscus of the nozzle 17 by preliminary ejecting of ink to the capping member 12 from each nozzle 17 of the recording head 2, a suction operation (head cleaning) where a suction pump (not shown) is driven after the recording head 2 is capped by the capping member 12, ink where the viscosity has become high, attached dust, or the like is forcibly suctioned from each nozzle 17, the meniscus is adjusted, and ink is normally ejected from the recording head 2, and a wiping operation where ink attached to a vicinity of the nozzle 17, thickened ink, and the like is removed, and where a purge operation is performed where the meniscus of the nozzle 17 is destroyed and the meniscus is readjusted, by a wiper blade (wiping member) 13 wiping the nozzle surface 21A of the recording head 2.

Next, ink ejected from the recording head 2 will be described.

The ink of the embodiment relates to super-penetrative water-based ink. In addition, the super-penetrative water-based ink is not only pigment ink and dye ink but may also be functional water-based inks such as pigments, metallic fine particles, ceramic fine particles, semiconductor fine particles, or resins. Here, the super-penetrative ink refers to ink which has a surface tension which is lower than the critical surface tension of cellulose (paper).

In addition, in the water-based ink, various additives may be included. According to the purpose, it is preferable to include a plurality of, for example, a surfactant, a moisturizing agent, a pH adjuster, a pigment, a dye, a colorant, metallic fine particles, ceramic fine particles, semiconductor fine particles, a resin, an organic solvent, metallic ions, a curling suppressant, a bleeding suppressant, a paddling suppressant, a penetration adjuster, a preservative, a fungicide, a dissolving auxiliary agent, an antioxidant, or the like.

The ink of the embodiment is oleic acid and a dispersant added to the water-based ink.

The oleic acid used in the ink of the embodiment has a surface tension which is lower than the critical surface tension of cellulose (paper), has a lipophilic property of HLB=1, and has a water repelling property. The critical surface tension of cellulose at 20° C. is 40 to 45 mN/m and the surface tension of oleic acid at 20° C. is 35 mN/m. The oleic acid is liquid at normal temperate and does not solidify even when separated.

As a fatty acid which has similar properties to the oleic acid used in the ink of the embodiment, there is linoleic acid, linolenic acid, and the like. The oleic acid is more preferable than the other fatty acids in terms of oxidation stability, and the oleic acid which has been is purified or a plant oil such as olive oil where oleic acid is the main component may be used.

In the dispersant of the embodiment, it is possible to use potassium oleate or sodium oleate with a hydrophilic property of HLB>12.

It is difficult to stably disperse only the oleic acid with a lipophilic property in water and in water-based ink, but when potassium oleate or sodium oleate with a hydrophilic property is added at the same time, it is possible to emulsify and stably disperse the oleic acid with a lipophilic property and it is possible to significantly increase the amount of oleic acid added.

In addition, in the dispersant of the embodiment, it is possible to use ethanol.

It is difficult to stably disperse only the oleic acid with a lipophilic property in water and in water-based ink, but when ethanol which has good compatibility with relation to dissolving the oleic acid and water is added at the same time, it is possible to emulsify and stably disperse the oleic acid with a lipophilic property and it is possible to significantly increase the amount of oleic acid added.

As a type of alcohol which has similar properties to the ethanol used in the ink of the embodiment, there is methanol, ethanol, propanol, and the like. The ethanol is more preferable than the other alcohols as it is easy to handle with a boiling point of 78° C. and is superior in terms of solubility of the oleic acid.

In the ink of the embodiment, the oleic acid and the dispersant may be added at the initial ink manufacturing if the relationship described above is satisfied or the oleic acid and the dispersant with the relationship described above may be added afterwards to a super-penetrative water-based dye ink, water-based pigment ink, or functional water-based ink used in the past. Of course, adding afterwards is preferable since the balance of the overall ink does not break down, it is not necessary to reformulate the ink, and it is possible to easily reduce satellites during high-speed printing.

Since ink which includes the oleic acid is used, it is preferable if the printer 1 of the embodiment uses a piezo-type ink jet head where there are less concerns of oxidation of the oleic acid due to heat. In addition, a thermal-type ink jet head may be used if the amount of oleic acid added is small, but it is preferable if the ink jet head is a piezo-type where there are less concerns of nozzle clogging due to oxidation of the oleic acid.

Next, an action and an effect relating to suppression of the inducement of missing nozzles during a wiping operation of the printer 1 with the configuration described above will be described with reference to FIG. 4.

Figure 4:
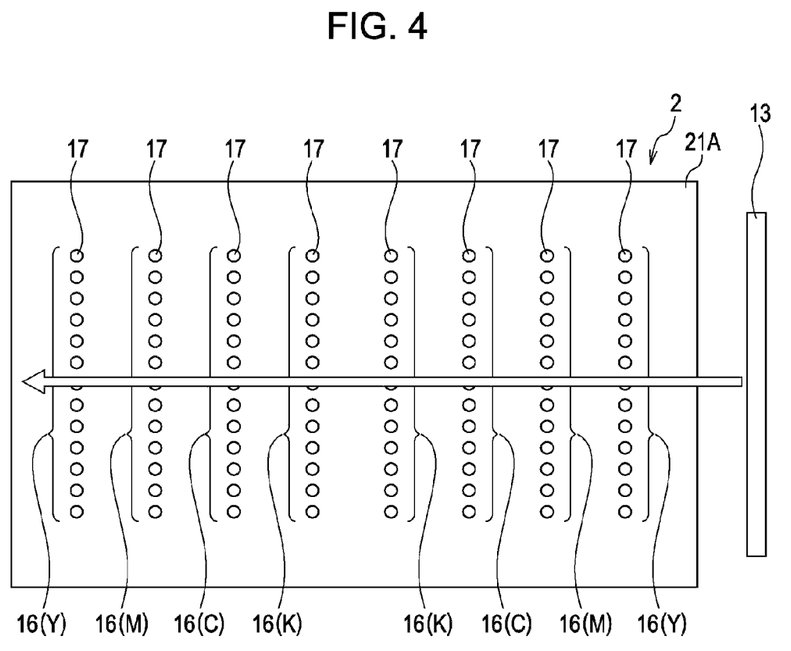
FIG. 4 is a diagram illustrating an appearance of a nozzle surface during a wiping operation according to an embodiment of the invention.

FIG. 4 is a diagram illustrating an appearance of the nozzle surface 21A during a wiping operation according to the embodiment of the invention.

The ink of the embodiment is the oleic acid which is difficult to dissolve in water being emulsified in the water-based ink using the dispersant and dispersed in the solvent (water) of the water-based ink. The oleic acid dispersed in the ink separates as a liquid oil film which is close to a monomolecular film when moisture in the ink evaporates and tends to remain on the surface of the wiper blade 13 or the surface of the ink attached to the wiper blade 13. Since the oleic acid has lipophilic and water-repelling properties, and since the ink, which is in the nozzle vicinity inside the nozzle 17 when the nozzle surface 21A is wiped, is not drawn out, it is difficult for missing nozzles to be induced. That is, according to the invention, since a water repelling property is applied to the wiper blade 13 due to coming in contact with the oleic acid during a wiping operation, it is possible to suppress the deterioration of the water repelling property of the wiper blade 13 due to deposits of ink. In addition, an oil film is transferred to the nozzle surface 21A and a water repelling property is applied when the wiper blade 13 wipes the nozzle surface 21A.

In addition, in order to realize the action of the suppression of the inducement of missing nozzles described above, it is not necessary to add the oleic acid and the dispersant to the ink of all of the nozzle rows 16, and it is sufficient if the oleic acid and the dispersant are added to at least the ink of one row.

For example, if the oleic acid and the dispersant are added to the water-based ink which is ejected from the first nozzle row 16 (nozzle row 16 (Y) in the embodiment) which comes into contact with the wiper blade 13 during a wiping operation, since the wiper blade 13 comes into contact with and applies a water repelling property to the first nozzle row 16 (Y) which ejects the water-based ink with the oleic acid dispersed therein during a wiping operation, it is possible to suppress inducement of missing nozzles from the other nozzle rows 16 which the wiper blade 13 comes into contact with later.

In addition, for example, if the oleic acid and the dispersant are added to the water-based ink which is ejected from the nozzle row 16 (K) which corresponds to a black color tone, since the usage frequency of the water-based ink of the black color tone is high, it is easier for the ink to become a mist and adhere to the nozzle surface 21A compared to the ink of other color tones, but since the oleic acid is added and dispersed in the ink, a water repelling property is easily applied to the wiping blade 13 during a wiping operation and a water repelling property is also easily applied to the nozzle surface 21A.

In addition, in order to proactively perform a water repelling process on the wiper blade 13, ink with the oleic acid and the dispersant added therein may be periodically ejected toward the wiper blade 13.

In the embodiment, the oleic acid is used which has a lower surface tension at 20° C. than the critical surface tension of cellulose. As a result, even if the ink surface is covered by an oil film where the oleic acid has separated, the first ink discharge is discharged along with the oil film, but after landing on the recording paper 6, the oleic acid which has separated on the surface of ink droplets rapidly penetrates into cellulose. As a result, after landing on the recording paper 6, the surface tension of the overall ink dominates, it is possible to maintain the super-penetrativeness of the ink, and it is possible to maintain the rapid drying of the ink. In addition, from the second ink discharge onwards, the penetration and evaporation of ink is not suppressed since the oil film is not formed.

As above, according to the printer 1 of the embodiment, it is possible to easily and cheaply suppress the inducement of missing nozzles during a wiping operation.

EXAMPLES

Below, the effect of the invention will be made clearer using an example. In addition, the invention is not limited to the example below and appropriate modifications can be made within the scope which does not change the gist of the invention.

Manufacturing Method of Pigment Ink

The ink used is where improvements were performed on existing PX ink manufactured by Seiko Epson Corp. which is disclosed in the reference; Mari Sakai, "Piezo-type Ink Jet Printing Technology and PX Inks", Annual Meeting of Union of Chemistry-Related Societies in Chubu Area (2008), p. 75, 34.

In addition, in regard to PX ink, there is also a description in the reference; Japan Society of Color Material, Miharu Kanaya et al., "Printing Ink Course Book, p. 51, Japan Society of Color Material (2007).

The oleic acid, potassium oleate, and purified water were mixed in a ratio of 2:3:5 by stirring or ultrasonic waves and an oleic acid dispersion liquid was manufactured. The manufactured dispersion liquid was added in 2 weight % to black water-based pigment ink used in a printer PX-B500 manufactured by Seiko Epson Corp., and dispersion by stirring or ultrasonic waves was performed. In addition, the adding of purified water to the added liquid is to form a stable micellar structure of the oleic acid in water before being added to the ink and to improve the dispersion stability of the oleic acid in the ink.

The surface tension of the PX-B500 ink (may be referred to below as normal PX ink) is 27 mN/m and the surface tension of the manufactured ink (may be referred to below as improved PX ink) is 28 mN/m.

Method of Confirming Inducement of Missing Nozzles

The manufactured ink was input into a black ink cartridge of the printer PX-B500 manufactured by Seiko Epson Corp. and was made to be in a state where printing is possible. The printer PX-B-500 manufactured by Seiko Epson Corp. was improved only so as to be able to perform a wiping operation.

After head cleaning of the mounted PX-B500 was performed and it was confirmed that the number of missing nozzles in a missing nozzle check pattern is zero, the printer 1 was left for one hour, a wiping operation was performed, and the number of missing nozzles induced after wiping was confirmed. Since the missing nozzle is a stochastic phenomenon, an average value of a total of three experiments was used.

Table 1 shows a relationship between an ink composition, a nozzle row which ejects ink with the oleic acid (shown by the symbol ○), and the number of missing nozzles induced after wiping.

In the example 1, in regard to the improved PX ink manufactured in accordance with the sequence of the ink manufacturing method described above, the number of missing nozzles induced was confirmed in accordance with the confirmation method described above.

In the examples 2 to 4, the improved PX ink (magenta (M), cyan (C), yellow (Y)), which was manufactured in accordance with the sequence of the ink manufacturing method described above, was input into an ink cartridge corresponding to one color and the number of missing nozzles induced was confirmed in accordance with the example 1.

In the example 5, the improved PX ink (black (K), magenta (M), cyan (C), yellow (Y)), which was manufactured in accordance with the sequence of the ink manufacturing method described above, was input into ink cartridges corresponding all colors and the number of missing nozzles induced was confirmed in accordance with the example 1.

In the comparative examples 1 to 4, an ink composition was changed as in Table 1, the sequence of the ink manufacturing method was in accordance with the ink manufacturing method of the example 1 and the ink was manufactured. The number of missing nozzles induced was confirmed using the same confirmation method as the example 1. In addition, the comparative example 2 used an ink which was used in the comparative example 1 and which had been left for one month, and the number of missing nozzles induced was confirmed in accordance with the example 1.

In the comparative example 5, normal PX ink was used and the number of missing nozzles induced was confirmed in accordance with the example 1.

TABLE 1

|  | Ink Composition | | | | ○ = Ink with Oleic Acid | | | | Number of Missing Nozzles induced after Wiping | | | |
|---|---|---|---|---|---|---|---|---|---|---|---|---|
|  | PX-B500 Ink | Oleic Acid | Potassium Oleate | Purified Water | K | M | C | Y | K | M | C | Y |
| Example 1 | 98 wt % | 0.4 wt % | 0.6 wt % | 1 wt % | ○ |  |  |  | 0 | 0 | 0 | 0 |
| Example 2 | 98 wt % | 0.4 wt % | 0.6 wt % | 1 wt % |  | ○ |  |  | 1 | 0 | 0 | 1 |
| Example 3 | 98 wt % | 0.4 wt % | 0.6 wt % | 1 wt % |  |  | ○ |  | 1 | 0 | 0 | 0 |
| Example 4 | 98 wt % | 0.4 wt % | 0.6 wt % | 1 wt % |  |  |  | ○ | 0 | 0 | 0 | 0 |
| Example 5 | 98 wt % | 0.4 wt % | 0.6 wt % | 1 wt % | ○ | ○ | ○ | ○ | 0 | 0 | 0 | 0 |
| Comparative example 1 | 98 wt % | 0.4 wt % | — | 1 wt % | ○ |  |  |  | 1 | 0 | 0 | 0 |
| Comparative example 2 | 98 wt % | 0.4 wt % | — | 1 wt % | ○ |  |  |  | 3 | 2 | 2 | 2 |
| Comparative example 3 | 98 wt % | — | 0.6 wt % | 1 wt % | ○ |  |  |  | 2 | 2 | 2 | 1 |
| Comparative example 4 | 98 wt % | — | — | 1 wt % | ○ |  |  |  | 3 | 3 | 2 | 2 |
| Comparative example 5 | 100 wt % | — | — | — | — | — | — | — | 3 | 2 | 3 | 2 |

According to Table 1, it is understood that a suppressing effect on the inducement of missing nozzles is realized by the set of the oleic acid and the potassium oleate. In addition, according to Table 1, if the oleic acid is in the Y color which initially comes into contact with the wiper blade, the number of missing nozzles induced in all of the nozzles was zero and it is understood that there is a large suppressing effect on the inducement of missing nozzles. Furthermore, according to Table 1, if the oleic acid is in the K color which has a high usage frequency and where nuzzle suction tends to occur, the number of missing nozzles induced in all of the nozzles was zero and it is understood that there is a large suppressing effect on the inducement of missing nozzles. Furthermore, according to Table 1, in the case where only the oleic acid is added, it is understood that there is a suppressing effect on the inducement of missing nozzles in the same manner as the comparative example 1 in the short term, but the suppressing effect on the inducement of missing nozzles disappears since there is no dispersion stability if the ink is left for one month in the same manner as the comparative example 2. Furthermore, according to Table 1, in the case where only the potassium oleate is added, it is understood that there is no suppressing effect on the inducement of missing nozzles.

Table 2 shows a relationship between an ink composition, nozzle row which ejects ink with the oleic acid (shown by the symbol ○), and the number of missing nozzles induced after wiping.

In the examples 6 to 10, the dispersant is changed from potassium oleate to ethanol, the improved PX ink is manufactured in accordance with the sequence of the ink manufacturing method described above, and experiments are performed in the same manner as the examples 1 to 5. The number of missing nozzles induced was confirmed using the same confirmation method as the example 1.

In the comparative example 6, ethanol and purified water are added without the oleic acid and experiments are performed in the same manner as the example 1. The number of missing nozzles induced was confirmed using the same confirmation method as the example 1.

According to Table 2, it is understood that a suppressing effect on the inducement of missing nozzles is realized even if the ethanol is used as the dispersant of the oleic acid. In addition, according to Table 2, in the case of the comparative example 6 where ethanol is added without the oleic acid, it is understood that drying of the ink is promoted by the ethanol and the number of missing nozzles induced significantly deteriorates.

Table 3 shows a relationship between an ink composition, nozzle row which ejects ink with the oleic acid (shown by the symbol ○), and the number of missing nozzles induced after wiping.

In the comparative examples 7 to 14 and the examples 11 to 20, the ratio of the oleic acid and the potassium oleate added is changed, the improved PX ink is manufactured, and the number of missing nozzles induced was confirmed in accordance with the example 1.

TABLE 2

| | Ink Composition | | | | ○ = Ink with Oleic Acid | | | | Number of Missing Nozzles induced after Wiping | | | |
| --- | --- | --- | --- | --- | --- | --- | --- | --- | --- | --- | --- | --- |
| | PX-B500 Ink | Oleic Acid | Ethanol | Purified Water | K | M | C | Y | K | M | C | Y |
| Example 6 | 98 wt % | 0.4 wt % | 0.6 wt % | 1 wt % | ○ | | | | 0 | 0 | 0 | 0 |
| Example 7 | 98 wt % | 0.4 wt % | 0.6 wt % | 1 wt % | | ○ | | | 1 | 0 | 0 | 1 |
| Example 8 | 98 wt % | 0.4 wt % | 0.6 wt % | 1 wt % | | | ○ | | 1 | 0 | 0 | 0 |
| Example 9 | 98 wt % | 0.4 wt % | 0.6 wt % | 1 wt % | | | | ○ | 0 | 0 | 0 | 0 |
| Example 10 | 98 wt % | 0.4 wt % | 0.6 wt % | 1 wt % | ○ | ○ | ○ | ○ | 0 | 0 | 0 | 0 |
| Comparative example 6 | 98 wt % | — | 0.6 wt % | 1 wt % | ○ | | | | 12 | 10 | 14 | 10 |

TABLE 3

| | Ink Composition | | | | ○ = Ink with Oleic Acid | | | | Number of Missing Nozzles induced after Wiping | | | |
| --- | --- | --- | --- | --- | --- | --- | --- | --- | --- | --- | --- | --- |
| | PX-B500 Ink | Oleic Acid | Potassium Oleate | Purified Water | K | M | C | Y | K | M | C | Y |
| Comparative example 7 | 98.39 wt % | 0.01 wt % | 0.6 wt % | 1 wt % | ○ | | | | 3 | 3 | 2 | 2 |
| Comparative example 8 | 98.37 wt % | 0.03 wt % | 0.6 wt % | 1 wt % | ○ | | | | 3 | 2 | 2 | 1 |
| Example 11 | 98.35 wt % | 0.05 wt % | 0.6 wt % | 1 wt % | ○ | | | | 1 | 0 | 1 | 0 |
| Example 12 | 98.3 wt % | 0.1 wt % | 0.6 wt % | 1 wt % | ○ | | | | 0 | 0 | 0 | 0 |
| Example 13 | 97.9 wt % | 0.5 wt % | 0.6 wt % | 1 wt % | ○ | | | | 0 | 0 | 0 | 0 |
| Example 14 | 97.4 wt % | 1 wt % | 0.6 wt % | 1 wt % | ○ | | | | 0 | 0 | 0 | 0 |
| Example 15 | 96.4 wt % | 2 wt % | 0.6 wt % | 1 wt % | ○ | | | | 0 | 0 | 0 | 0 |
| Example 16 | 95.4 wt % | 3 wt % | 0.6 wt % | 1 wt % | ○ | | | | 1 | 0 | 0 | 0 |
| Comparative example 9 | 94.4 wt % | 4 wt % | 0.6 wt % | 1 wt % | ○ | | | | 2 | 2 | 1 | 2 |
| Comparative example 10 | 93.4 wt % | 5 wt % | 0.6 wt % | 1 wt % | ○ | | | | 3 | 3 | 2 | 2 |
| Comparative example 11 | 98.93 wt % | 0.02 wt % | 0.05 wt % | 1 wt % | ○ | | | | 3 | 4 | 3 | 2 |
| Example 17 | 98.9 wt % | 0.05 wt % | 0.05 wt % | 1 wt % | ○ | | | | 1 | 1 | 1 | 0 |
| Example 18 | 95.95 wt % | 3 wt % | 0.05 wt % | 1 wt % | ○ | | | | 0 | 1 | 0 | 0 |
| Comparative example 12 | 93.95 wt % | 5 wt % | 0.05 wt % | 1 wt % | ○ | | | | 3 | 2 | 3 | 2 |
| Comparative example 13 | 95.98 wt % | 0.02 wt % | 3 wt % | 1 wt % | ○ | | | | 3 | 3 | 2 | 2 |
| Example 19 | 95.95 wt % | 0.05 wt % | 3 wt % | 1 wt % | ○ | | | | 1 | 1 | 1 | 1 |
| Example 20 | 93 wt % | 3 wt % | 3 wt % | 1 wt % | ○ | | | | 1 | 1 | 1 | 0 |
| Comparative example 14 | 91 wt % | 5 wt % | 3 wt % | 1 wt % | ○ | | | | 3 | 3 | 3 | 3 |

According to Table 3, it is understood that, if the oleic acid is less than 0.05 weight %, it is difficult for a suppressing effect on the inducement of missing nozzles to be realized. In addition, according to Table 3, it is understood that, if the oleic acid exceeds 3.00 weight %, the dispersion stability is lowered and there is a detrimental influence on the suppressing effect on the inducement of missing nozzles.

Table 4 shows a relationship between an ink composition, nozzle row which ejects ink with the oleic acid (shown by the symbol ○), and the number of missing nozzles induced after wiping.

In the comparative examples 15 to 22 and the examples 21 to 30, the ratio of the oleic acid and the ethanol added is changed, the improved PX ink is manufactured, and the number of missing nozzles induced was confirmed in accordance with the example 1.

the inducement of missing nozzles to be realized. In addition, according to Table 4, it is understood that, even if the dispersant is changed to ethanol and if the oleic acid exceeds 3.00 weight %, the dispersion stability is lowered and there is a detrimental influence on the suppressing effect on the inducement of missing nozzles. Furthermore, according to Table 4, it is understood that, if the oleic acid is decreased and the ethanol is increased, drying of the ink is promoted and the number of missing nozzles induced significantly deteriorates.

Table 5 shows a relationship between an ink composition, nozzle row which ejects ink with the oleic acid (shown by the symbol ○), and the number of missing nozzles induced after wiping.

In the comparative examples 23 to 30 and the examples 31 to 40, the ratio of the oleic acid and the potassium oleate

TABLE 4

| | Ink Composition | | | | ○ = Ink with Oleic Acid | | | | Number of Missing Nozzles induced after Wiping | | | |
|---|---|---|---|---|---|---|---|---|---|---|---|---|
| | PX-B500 Ink | Oleic Acid | Ethanol | Purified Water | K | M | C | Y | K | M | C | Y |
| Comparative example 15 | 98.39 wt % | 0.01 wt % | 0.6 wt % | 1 wt % | ○ | | | | 5 | 6 | 7 | 5 |
| Comparative example 16 | 98.37 wt % | 0.03 wt % | 0.6 wt % | 1 wt % | ○ | | | | 3 | 4 | 5 | 3 |
| Example 21 | 98.35 wt % | 0.05 wt % | 0.6 wt % | 1 wt % | ○ | | | | 1 | 1 | 1 | 1 |
| Example 22 | 98.3 wt % | 0.1 wt % | 0.6 wt % | 1 wt % | ○ | | | | 0 | 0 | 0 | 0 |
| Example 23 | 97.9 wt % | 0.5 wt % | 0.6 wt % | 1 wt % | ○ | | | | 0 | 0 | 0 | 0 |
| Example 24 | 97.4 wt % | 1 wt % | 0.6 wt % | 1 wt % | ○ | | | | 0 | 0 | 0 | 0 |
| Example 25 | 96.4 wt % | 2 wt % | 0.6 wt % | 1 wt % | ○ | | | | 0 | 0 | 0 | 0 |
| Example 26 | 95.4 wt % | 3 wt % | 0.6 wt % | 1 wt % | ○ | | | | 1 | 0 | 0 | 0 |
| Comparative example 17 | 94.4 wt % | 4 wt % | 0.6 wt % | 1 wt % | ○ | | | | 2 | 1 | 1 | 2 |
| Comparative example 18 | 93.4 wt % | 5 wt % | 0.6 wt % | 1 wt % | ○ | | | | 3 | 3 | 3 | 2 |
| Comparative example 19 | 98.93 wt % | 0.02 wt % | 0.05 wt % | 1 wt % | ○ | | | | 3 | 4 | 4 | 2 |
| Example 27 | 98.9 wt % | 0.05 wt % | 0.05 wt % | 1 wt % | ○ | | | | 1 | 1 | 1 | 1 |
| Example 28 | 95.95 wt % | 3 wt % | 0.05 wt % | 1 wt % | ○ | | | | 0 | 1 | 0 | 0 |
| Comparative example 20 | 93.95 wt % | 5 wt % | 0.05 wt % | 1 wt % | ○ | | | | 3 | 3 | 3 | 2 |
| Comparative example 21 | 95.98 wt % | 0.02 wt % | 3 wt % | 1 wt % | ○ | | | | 5 | 5 | 6 | 5 |
| Example 29 | 95.95 wt % | 0.05 wt % | 3 wt % | 1 wt % | ○ | | | | 1 | 1 | 1 | 1 |
| Example 30 | 93 wt % | 3 wt % | 3 wt % | 1 wt % | ○ | | | | 1 | 1 | 1 | 1 |
| Comparative example 22 | 91 wt % | 5 wt % | 3 wt % | 1 wt % | ○ | | | | 3 | 3 | 3 | 3 |

According to Table 4, it is understood that, even if the dispersant is changed to ethanol and if the oleic acid is less than 0.05 weight %, it is difficult for a suppressing effect on added is changed, the improved PX ink is manufactured, and the number of missing nozzles induced was confirmed in accordance with the example 1.

TABLE 5

| | Ink Composition | | | | ○ = Ink with Oleic Acid | | | | Number of Missing Nozzles induced after Wiping | | | |
|---|---|---|---|---|---|---|---|---|---|---|---|---|
| | PX-B500 Ink | Oleic Acid | Potassium Oleate | Purified Water | K | M | C | Y | K | M | C | Y |
| Comparative example 23 | 98.59 wt % | 0.4 wt % | 0.01 wt % | 1 wt % | ○ | | | | 3 | 2 | 2 | 3 |
| Comparative example 24 | 98.57 wt % | 0.4 wt % | 0.03 wt % | 1 wt % | ○ | | | | 3 | 2 | 2 | 2 |
| Example 31 | 98.55 wt % | 0.4 wt % | 0.05 wt % | 1 wt % | ○ | | | | 1 | 1 | 1 | 1 |
| Example 32 | 98.5 wt % | 0.4 wt % | 0.1 wt % | 1 wt % | ○ | | | | 0 | 0 | 0 | 0 |
| Example 33 | 98.1 wt % | 0.4 wt % | 0.5 wt % | 1 wt % | ○ | | | | 0 | 0 | 0 | 0 |
| Example 34 | 97.6 wt % | 0.4 wt % | 1 wt % | 1 wt % | ○ | | | | 0 | 0 | 0 | 0 |
| Example 35 | 96.6 wt % | 0.4 wt % | 2 wt % | 1 wt % | ○ | | | | 0 | 0 | 0 | 0 |
| Example 36 | 95.6 wt % | 0.4 wt % | 3 wt % | 1 wt % | ○ | | | | 1 | 0 | 0 | 0 |
| Comparative example 25 | 94.6 wt % | 0.4 wt % | 4 wt % | 1 wt % | ○ | | | | 2 | 1 | 1 | 2 |
| Comparative example 26 | 93.6 wt % | 0.4 wt % | 5 wt % | 1 wt % | ○ | | | | 3 | 2 | 3 | 2 |
| Comparative example 27 | 98.93 wt % | 0.05 wt % | 0.02 wt % | 1 wt % | ○ | | | | 3 | 2 | 2 | 2 |
| Example 37 | 98.9 wt % | 0.05 wt % | 0.05 wt % | 1 wt % | ○ | | | | 1 | 1 | 1 | 0 |
| Example 38 | 95.95 wt % | 0.05 wt % | 3 wt % | 1 wt % | ○ | | | | 1 | 1 | 1 | 1 |
| Comparative example 28 | 93.95 wt % | 0.05 wt % | 5 wt % | 1 wt % | ○ | | | | 3 | 3 | 3 | 2 |
| Comparative example 29 | 95.98 wt % | 3 wt % | 0.02 wt % | 1 wt % | ○ | | | | 3 | 2 | 3 | 2 |

TABLE 5-continued

| | Ink Composition | | | | ○ = Ink with Oleic Acid | | | | Number of Missing Nozzles induced after Wiping | | | |
|---|---|---|---|---|---|---|---|---|---|---|---|---|
| | PX-B500 Ink | Oleic Acid | Potassium Oleate | Purified Water | K | M | C | Y | K | M | C | Y |
| Example 39 | 95.95 wt % | 3 wt % | 0.05 wt % | 1 wt % | ○ | | | | 1 | 1 | 1 | 1 |
| Example 40 | 93 wt % | 3 wt % | 3 wt % | 1 wt % | ○ | | | | 1 | 1 | 1 | 0 |
| Comparative example 30 | 91 wt % | 3 wt % | 5 wt % | 1 wt % | ○ | | | | 3 | 3 | 3 | 3 |

According to Table 5, it is understood that, if the potassium oleate is less than 0.05 weight %, the dispersion stability of the oleic acid is lowered and there is a detrimental influence on the suppressing effect on the inducement of missing nozzles. In addition, according to Table 5, it is understood that, if the potassium oleate exceeds 3.00 weight %, the oleic acid is dissolved and the oil film is not stable, and it is difficult for a sufficient suppressing effect on the inducement of missing nozzles to be realized.

Table 6 shows a relationship between an ink composition, nozzle row which ejects ink with the oleic acid (shown by the symbol ○), and the number of missing nozzles induced after wiping.

In the comparative examples 31 to 38 and the examples 41 to 50, the ratio of the oleic acid and the ethanol added is changed, the improved PX ink is manufactured, and the number of missing nozzles induced was confirmed in accordance with the example 1.

Table 7 shows a relationship between an ink composition, nozzle row which ejects ink with the oleic acid (shown by the symbol ○), and the number of missing nozzles induced after wiping.

In the example 51, the PX ink is changed to a water-based dye ink used in a printer EP-802A manufactured by Seiko Epson Corp.

Manufacturing Method of Dye Ink

The oleic acid, potassium oleate, and purified water were mixed in a ratio of 2:3:5 by stirring or ultrasonic waves and an oleic acid dispersion liquid was manufactured. The manufactured dispersion liquid was added in 2 weight % to a water-based dye ink used in the printer EP-802A manufactured by Seiko Epson Corp., and dispersion by stirring or ultrasonic waves was performed.

In the example 51, the manufactured ink described above was input into an ink cartridge of the improved printer PX-B500 manufactured by Seiko Epson Corp. described above and the number of missing nozzles induced was confirmed using the same confirmation method as the example 1.

In the comparative example 39, the water-based dye ink used in the printer EP-802A manufactured by Seiko Epson Corp. was input into an ink cartridge of the improved printer PX-B500 manufactured by Seiko Epson Corp. described above and the number of missing nozzles induced was confirmed using the same confirmation method as the example 1.

TABLE 6

| | Ink Composition | | | | ○ = Ink with Oleic Acid | | | | Number of Missing Nozzles induced after Wiping | | | |
|---|---|---|---|---|---|---|---|---|---|---|---|---|
| | PX-B500 Ink | Oleic Acid | Ethanol | Purified Water | K | M | C | Y | K | M | C | Y |
| Comparative example 31 | 98.59 wt % | 0.4 wt % | 0.01 wt % | 1 wt % | ○ | | | | 3 | 2 | 2 | 3 |
| Comparative example 32 | 98.57 wt % | 0.4 wt % | 0.03 wt % | 1 wt % | ○ | | | | 3 | 3 | 2 | 2 |
| Example 41 | 98.55 wt % | 0.4 wt % | 0.05 wt % | 1 wt % | ○ | | | | 1 | 1 | 1 | 1 |
| Example 42 | 98.5 wt % | 0.4 wt % | 0.1 wt % | 1 wt % | ○ | | | | 0 | 0 | 0 | 0 |
| Example 43 | 98.1 wt % | 0.4 wt % | 0.5 wt % | 1 wt % | ○ | | | | 0 | 0 | 0 | 0 |
| Example 44 | 97.6 wt % | 0.4 wt % | 1 wt % | 1 wt % | ○ | | | | 0 | 0 | 0 | 0 |
| Example 45 | 96.6 wt % | 0.4 wt % | 2 wt % | 1 wt % | ○ | | | | 0 | 0 | 0 | 0 |
| Example 46 | 95.6 wt % | 0.4 wt % | 3 wt % | 1 wt % | ○ | | | | 1 | 1 | 1 | 0 |
| Comparative example 33 | 94.6 wt % | 0.4 wt % | 4 wt % | 1 wt % | ○ | | | | 2 | 2 | 3 | 2 |
| Comparative example 34 | 93.6 wt % | 0.4 wt % | 5 wt % | 1 wt % | ○ | | | | 3 | 3 | 4 | 3 |
| Comparative example 35 | 98.93 wt % | 0.05 wt % | 0.02 wt % | 1 wt % | ○ | | | | 3 | 2 | 2 | 2 |
| Example 47 | 98.9 wt % | 0.05 wt % | 0.05 wt % | 1 wt % | ○ | | | | 1 | 1 | 1 | 1 |
| Example 48 | 95.95 wt % | 0.05 wt % | 3 wt % | 1 wt % | ○ | | | | 1 | 1 | 1 | 1 |
| Comparative example 36 | 93.95 wt % | 0.05 wt % | 5 wt % | 1 wt % | ○ | | | | 3 | 3 | 4 | 3 |
| Comparative example 37 | 95.98 wt % | 3 wt % | 0.02 wt % | 1 wt % | ○ | | | | 3 | 2 | 3 | 2 |
| Example 49 | 95.95 wt % | 3 wt % | 0.05 wt % | 1 wt % | ○ | | | | 0 | 1 | 0 | 0 |
| Example 50 | 93 wt % | 3 wt % | 3 wt % | 1 wt % | ○ | | | | 1 | 1 | 1 | 1 |
| Comparative example 38 | 91 wt % | 3 wt % | 5 wt % | 1 wt % | ○ | | | | 3 | 3 | 4 | 3 |

According to Table 6, it is understood that, if the ethanol is less than 0.05 weight %, the dispersion stability of the oleic acid is lowered and there is a detrimental influence on the suppressing effect on the inducement of missing nozzles. In addition, according to Table 6, it is understood that, if the ethanol exceeds 3.00 weight %, the oleic acid is dissolved and the oil film of the oleic acid is not stable, and it is difficult for a sufficient suppressing effect on the inducement of missing nozzles to be realized.

TABLE 7

| | Ink Composition | | | | ○ = Ink with Oleic Acid | | | | Number of Missing Nozzles induced after Wiping | | | |
|---|---|---|---|---|---|---|---|---|---|---|---|---|
| | EP-802A Ink | Oleic Acid | Potassium Oleate | Purified Water | K | M | C | Y | K | M | C | Y |
| Example 51 | 98 wt % | 0.4 wt % | 0.6 wt % | 1 wt % | ○ | | | | 0 | 0 | 0 | 0 |
| Comparative example 39 | 100 wt % | — | — | — | ○ | | | | 3 | 2 | 2 | 2 |

According to Table 7, it is understood that, even with the water-based dye ink, a suppressing effect on the inducement of missing nozzles is realized.

Table 8 shows a relationship between an ink composition, nozzle row which ejects ink with the oleic acid (shown by the symbol ○), and the number of missing nozzles induced after wiping.

In the examples 52 and 53, the potassium oleate is changed to sodium oleate or ethanol, and the number of missing nozzles induced was confirmed using the same confirmation method as the example 1.

In the comparative examples 40 to 47, as the dispersant, potassium oleate and ethanol are used, and the oleic acid is changed to sodium oleate, oleyl alcohol, ethyl oleate, or sorbitan trioleate and the number of missing nozzles induced was confirmed using the same confirmation method as the example 1.

In the invention, when the oleic acid is in a water solution liquid with the potassium oleate, the sodium oleate, or the ethanol, it was found that nozzle clogging does not occur since the oleic acid becomes a oil film state close to a monomolecular film when moisture evaporates. In addition, while there is an effect as a wiping auxiliary agent when applied to a wiper in a similar manner as glycerin, it was found that there is also an effect when added in ink.

2. Suppression of Inducement of Missing Nozzles Due to Wiping

The oleic acid has good compatibility with rubber and plastic of wiper blades due to a lipophilic property and also has a water repelling property. As such, the oleic acid tends to remain on the wiper blade, and even if the water-based ink remains, when moisture evaporates, the oleic acid separates into an oil film state close to a liquid monomolecular film on the surface of the ink. As a result, even if there are portions

TABLE 8

| | Ink Composition | | | | ○ = Ink with Oleic Acid | | | | Number of Missing Nozzles induced after Wiping | | | |
|---|---|---|---|---|---|---|---|---|---|---|---|---|
| Amount Added | 98 wt % | 0.4 wt % | 0.6 wt % | 1 wt % | K | M | C | Y | K | M | C | Y |
| Example 1 | PX-B500 Ink | Oleic Acid | Potassium Oleate | Purified Water | ○ | | | | 0 | 0 | 0 | 0 |
| Example 52 | PX-B500 Ink | Oleic Acid | Sodium Oleate | Purified Water | ○ | | | | 0 | 0 | 0 | 0 |
| Example 53 | PX-B500 Ink | Oleic Acid | Ethanol | Purified Water | ○ | | | | 0 | 0 | 0 | 0 |
| Comparative example 40 | PX-B500 Ink | Sodium Oleate | Potassium Oleate | Purified Water | ○ | | | | 3 | 2 | 2 | 3 |
| Comparative example 41 | PX-B500 Ink | Sodium Oleate | Ethanol | Purified Water | ○ | | | | 3 | 2 | 2 | 2 |
| Comparative example 42 | PX-B500 Ink | Oleyl Alcohol | Potassium Oleate | Purified Water | ○ | | | | 3 | 3 | 3 | 3 |
| Comparative example 43 | PX-B500 Ink | Oleyl Alcohol | Ethanol | Purified Water | ○ | | | | 5 | 4 | 5 | 6 |
| Comparative example 44 | PX-B500 Ink | Ethyl Oleate | Potassium Oleate | Purified Water | ○ | | | | 3 | 3 | 3 | 3 |
| Comparative example 45 | PX-B500 Ink | Ethyl Oleate | Ethanol | Purified Water | ○ | | | | 4 | 3 | 5 | 6 |
| Comparative example 46 | PX-B500 Ink | Sorbitan Trioleate | Potassium Oleate | Purified Water | ○ | | | | 3 | 2 | 3 | 3 |
| Comparative example 47 | PX-B500 Ink | Sorbitan Trioleate | Ethanol | Purified Water | ○ | | | | 5 | 3 | 5 | 6 |

According to Table 8, it is understood that the combinations of the oleic acid and the potassium oleate, the oleic acid and the sodium oleate, and the oleic acid and the ethanol have the most effect.

For above, adding the oleic acid and the dispersant to the water-based ink at the same time has the following synergy effects.

1. Wiping Auxiliary Agent

Since the oleic acid has a high viscosity of 35 mN/m at 20° C. and does not dissolve in water or ink, nozzle clogging easily occurs when the oleic acid is directly applied to the nozzle surface.

where the ink remains and portions where no ink remains on the wiper blade, there is a substantially uniform water repelling property, there is no drawing out of the ink from only a portion of the nozzle, and it is difficult for missing nozzles to be induced.

3. Longer Life for Blades and Heads Due to Wiping

Since the oleic acid is also a lubricant, there is an effect that there is a reduction in friction resistance in the wiper blade and the head, and the life of the wiping mechanism is lengthened.

4. Reduction of Missing Nozzles Induced in Nozzles with Ink with No Oleic Acid

As described above, the ink jet head which uses ink with the oleic acid dispersed therein even for one color significantly reduces the inducement of missing nozzles due to wiping also in nozzles of other colors where the oleic acid is not included since the oleic acid remains on the wiper.

5. Ink Including the Oleic Acid

When the oleic acid is included in the ink of the nozzles which initially comes into contact with the wiper blade in a wiping operation, there is a superior effect in reducing the inducement of missing nozzles of other nozzles where the oleic acid is not included.

In addition, since black ink has a high printing frequency and wiping frequency, and flushing and cleaning are necessary when black ink is drawn into and mixed in the nozzles of other colors, there is a large effect when the oleic acid is included in the black ink.

6. Dispersion Stability of Oleic Acid with Lipophilic Property

The oleic acid with a lipophilic property does not stably disperse in water or in ink, but when a potassium fatty acid, a sodium fatty acid, or ethanol with a hydrophilic property is added at the same time, it is understood that the oleic acid is stably dispersed in water.

In addition, in a water solution liquid of only the potassium oleate or the sodium oleate, an oil film of the oleic acid is not possible. The oleic acid has a lipophilic property but by being added at the same time with the potassium oleate, the sodium oleate, or the ethanol with a hydrophilic property, a synergy effect is realized where oil film formation and stable dispersion are compatible.

7. Oxidation Stability of Fatty Acids and Oleic Acid

It is easy for many unsaturated fatty acids to be oxidized. This is because there are two or more double bonds and it is easy for methylene hydrogens interposed in the double bond to be removed and easily oxidized. This is true of linoleic acid and linolenic acid. Unsaturated fatty acids with one double bond have significant oxidation stability since there are no methylene hydrogens. This is true of oleic acid.

8. Melting Point of Fatty Acids and Oleic Acid

In a case when a fatty acid has separated on a nozzle surface, if the fatty acid is a liquid, the probability of nozzle clogging is reduced. The oleic acid is a fatty acid with one or fewer double bonds which is a liquid at normal temperature. There are many saturated fatty acids with oxidation stability which are solid at normal temperature and many are not suitable for adding in ink. As such, the oleic acid is preferable.

9. Potassium Oleate or Sodium Oleate

To stably disperse a fatty acid in water in ink, a metallic soap with a monovalent metallic ion is desirable. This is because when there are many divalent ions, there is a concern about separation and precipitation. In addition, when a fatty acid and a metallic fatty acid are dissolved and dispersed in ink at the same time, there is no distinction if the same type of fatty acids is used, and it is possible to realize a synergy effect where an increase in the amount of the fatty acid and stable dispersion are compatible. In particular, the effect is larger when the oleic acid and the potassium oleate or the sodium oleate are added at the same time.

As above, according to the invention, it is possible to easily and cheaply suppress the inducement of missing nozzles during a wiping operation.

What is claimed is:

1. An ink jet recording device comprising:
an ink jet head which has a nozzle surface where a plurality of nozzle opening ends are arranged and which ejects water-based ink from the nozzles to a recording medium; and
a wiping device that executes a wiping operation where the nozzle surface and a wiping member are brought into contact and the nozzle surface is wiped, wherein oleic acid and a dispersant for dispersing the oleic acid into water by emulsifying the oleic acid are added to the water-based ink, wherein 0.05 weight % or more and 3.00 weight or less of the oleic acid and 0.05 weight % or more and 3.00 weight % or less of the dispersant are added to the water-based ink, and wherein the dispersant is potassium oleate, sodium oleate, or ethanol.

2. The ink jet recording device according to claim 1, wherein the nozzle surface has a plurality of nozzle rows where the nozzles are arranged in a predetermined direction, and the oleic acid and the dispersant are added to the water-based ink ejected from at least one row out of the nozzle rows.

3. The ink jet recording device according to claim 1, wherein the nozzle surface has a plurality of nozzle rows where the nozzles are arranged in a predetermined direction, and the oleic acid and the dispersant are added to the water-based ink ejected from the first nozzle row which comes into contact with the wiping member during the wiping operation.

4. The ink jet recording device according to claim 1, wherein the nozzle surface has a plurality of nozzle rows where the nozzles are arranged in a predetermined direction for each type of ink with different color tones, and the oleic acid and the dispersant are added to the water-based ink ejected from the nozzle row which corresponds to a black color tone.

* * * * *